C. G. HEIBY, J. BURKAM, D. E. LINDQUIST, F. L. RIGGIN, E. W. ALLEN AND R. LAU.
BLANK FOR FUSE BODIES AND THE LIKE AND METHOD OF FORMING THE SAME.
APPLICATION FILED JAN. 17, 1918.

1,379,983.

Patented May 31, 1921.
2 SHEETS—SHEET 1.

Inventors
Carl C. Heiby     Fred L. Riggin
John Burkam      Ebenezer W. Allen
David E. Lindquist  Richard Lau

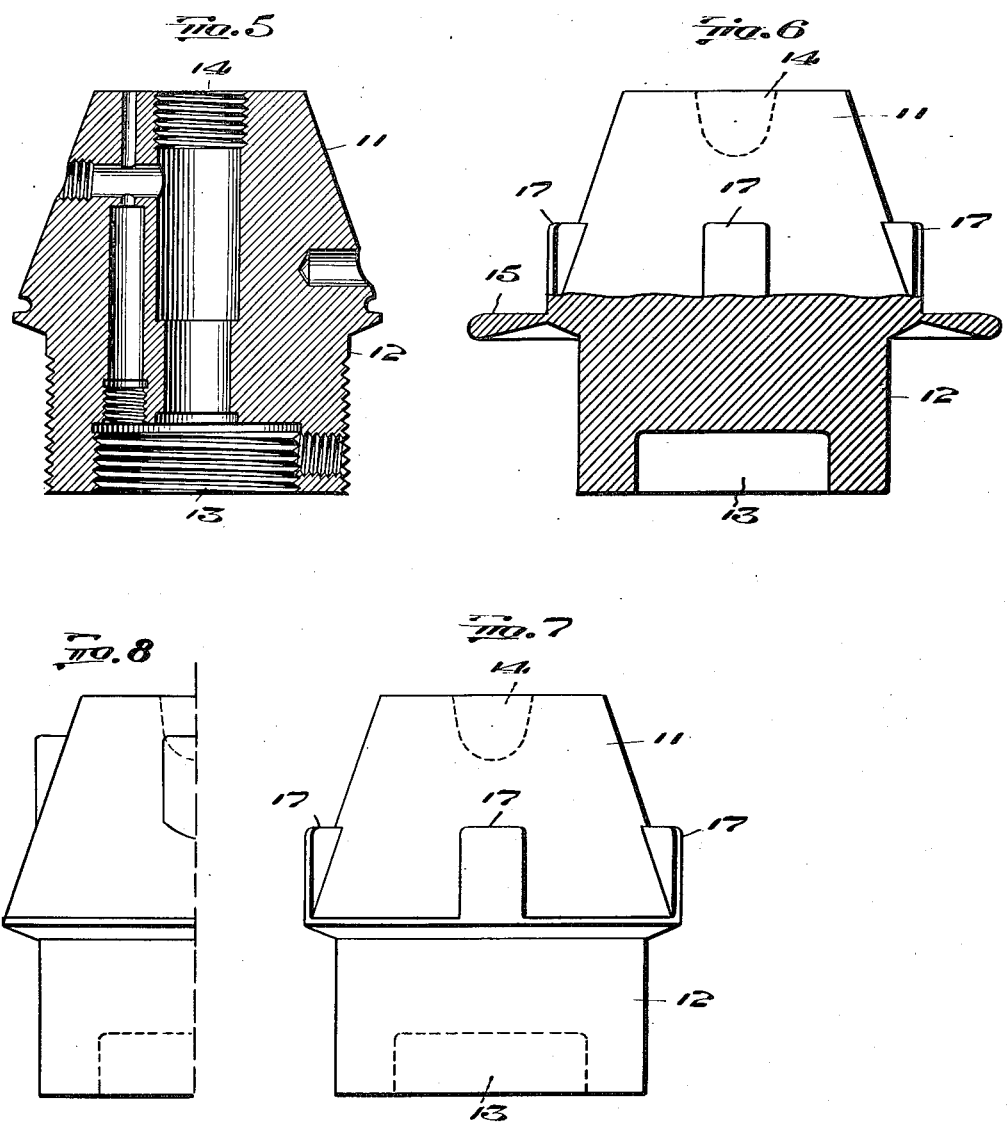

UNITED STATES PATENT OFFICE.

CARL G. HEIBY, JOHN BURKAM, DAVID E. LINDQUIST, FRED L. RIGGIN, EBENEZER W. ALLEN, AND RICHARD LAU, OF SARNIA, ONTARIO, CANADA, ASSIGNORS, BY MESNE ASSIGNMENTS, TO MUELLER METALS COMPANY, OF PORT HURON, MICHIGAN, A CORPORATION OF MICHIGAN.

BLANK FOR FUSE-BODIES AND THE LIKE AND METHOD OF FORMING THE SAME.

1,379,983.      Specification of Letters Patent.      Patented May 31, 1921.

Application filed January 17, 1918. Serial No. 212,227.

*To all whom it may concern:*

Be it known that we, CARL G. HEIBY, JOHN BURKAM, DAVID E. LINDQUIST, FRED L. RIGGIN, EBENEZER W. ALLEN, and RICHARD LAU, all citizens of the United States, except ALLEN, a subject of Great Britain, residing at Sarnia, in the county of Lambton, Ontario, and Dominion of Canada, have invented new and useful Improvements in Blanks for Fuse-Bodies and the like and Methods of Forming the Same, of which the following is a specification.

The present invention has to do with the manufacture of articles having a conical, spherical or irregular shape, and which must be subjected to milling and machining before they are brought to their final finished form. More particularly it has for its object to provide articles which may be formed by forging or casting to nearly their finished condition, so that the time, labor and waste to the milling and machining operations are greatly reduced, and the articles may be expeditiously and economically produced.

In the illustration herewith the invention is disclosed as applied to forgings or castings for fuse bodies, but it will be understood that the invention is not limited to that specific adaptation, since it is obvious it may be utilized in connection with articles other than the specific one herein disclosed.

In the making of fuse bodies, which illustrates the invention, it is necessary to machine and bore the blanks from which the finished articles are made, and such machining and finishing operations when applied to a slug are necessarily slow and costly, both by reason of time and labor expended, and the excessive waste of material. The present invention seeks to overcome these difficulties, and at the same time provide a forging or casting of such construction that it lends itself readily to the machining and finishing operations, in the practice of which it is necessary that a blank be provided which can be readily chucked in the lathe or other finishing machine.

Referring to the drawings, in which is illustrated the specific embodiment chosen to illustrate the invention—

Fig. 5 is a vertical cross section of the finished fuse body formed from the blank shown in the preceding figures.

Fig. 6 is a view in side elevation, partly in section, of a forged blank before trimming of a slightly different construction from that shown in the preceding figures.

Fig. 7 is a view in side elevation of a trimmed blank of the type shown in Fig. 6.

Fig. 8 is a view in side elevation of a portion of a blank showing the lugs located between the top and the base of the conical portion of the blank.

Figure 3:
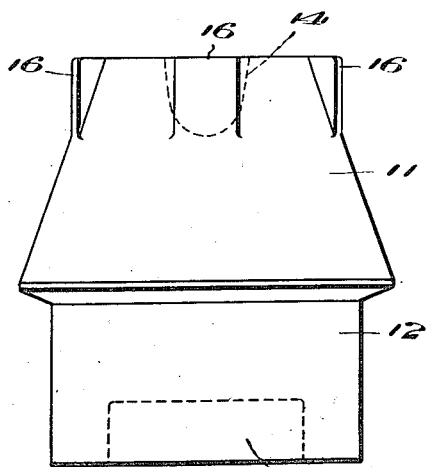
Fig. 3 is a view of the blank in side elevation after the trimming operation.

Referring to the drawings by numerals, like numbers indicating like parts in the several views, 10 indicates a slug from which if the article is to be forged it may be conveniently formed, although if it is cast it is obvious that it will take the form shown in Fig. 3 of the drawings. The slug 10 may be produced in any suitable fashion, either by casting, rolling from suitable stock, or in any other convenient manner, and it may, as is sometimes customary, be cut in proper lengths from what is known as "commercial rod."

Figure 1:
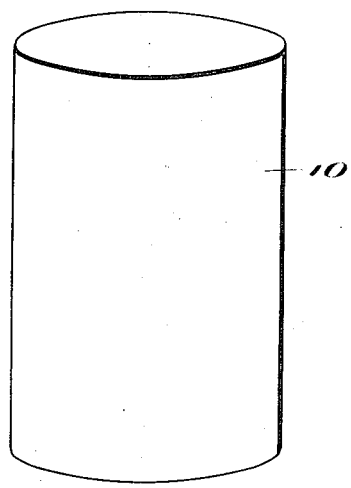
Figure 1 is a view of the slug from which the forging may be conveniently made, although it will be understood that so far as the practice of the present invention is concerned it may be carried out by casting, as well as by forging from a slug.
Figure 2:
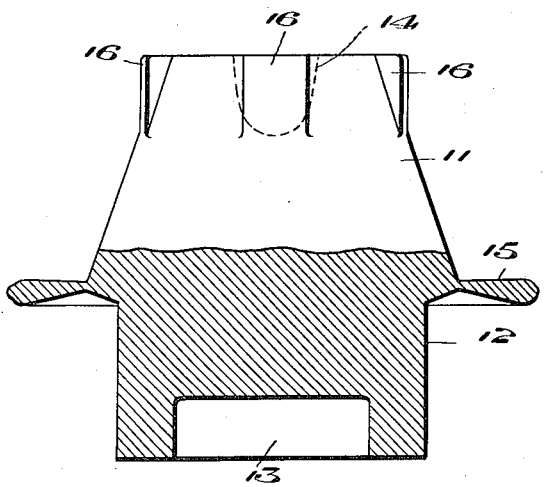
Fig. 2 is a view in side elevation, partly in section, of a blank formed from the slug shown in Fig. 1.

The slug 10 after being heated to the proper temperature for the forging operation is subjected to the action of a die press to form the article (in the present disclosure a fuse body) which is to be produced. In the present example, as shown in Fig. 2, a blank suitable for a fuse body is provided from the slug 10, this blank having the conical portion 11, the cylindrical portion 12 having forged in its bottom a depression 13, and if desired a depression 14 in its top, these cavities or depressions being formed during the forging operation, so as to avoid the necessity of boring and drilling completely the passages through the finished fuse body, as will appear from Fig. 5. The forged blank will have, as is usual, a flash or fin 15 which may be conveniently trimmed off, and the very small amount of waste material again melted and used, so that the blank ready for machining is as illustrated in Fig. 3 of the drawings.

It is obvious that the blanks having cylindrical and conical portions would be with some difficulty held in the chuck of a lathe or other finishing machine for the milling, boring and finishing operations, and in order that blanks may be provided with convenient means for doing this there is preferably formed on one of the chucking surfaces (conical surface as herein shown) a chuck engaging lug, or preferably a series of lugs 16, which, as shown, are symmetrically arranged and four in number, although it will be understood that the number of the lugs and their specific arrangement are not material, so long as a chuck engaging surface is provided.

Figure 4:
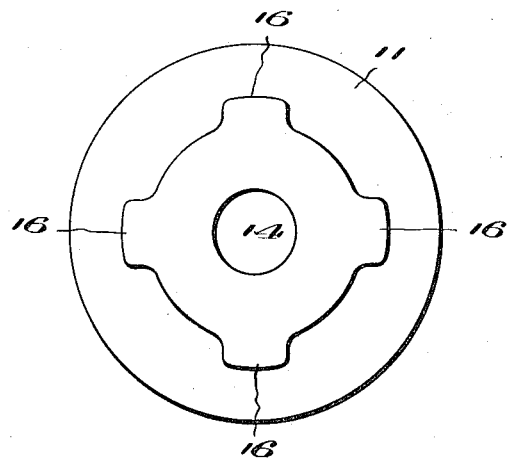
Fig. 4 is a plan view of the forged blank shown in Figs. 2 and 3.

In Figs. 2, 3 and 4 the lugs are located at the top of the conical surface of the blank, and these lugs not only serve as an engaging means by which the chuck may firmly engage the blank, but since they are outstanding from the conical surface they act also as driving means if the blank be rotated, and as holding means if the blank be held stationary and the tool rotated.

After the finishing operations have been completed these relatively small lugs will be machined or ground off to bring the fuse body to its final finished condition, as shown in Fig. 5, and as the amount of metal contained in these lugs is small the loss in material is negligible.

In the form of the invention shown in Figs. 6 and 7 the lugs 17 instead of being located at the top of the blank are located at the base of the cone surface, and obviously they might be located at any convenient point between the top and the bottom of the blank, as shown in Fig. 8, the only necessity being that they be of sufficient strength to insure a proper chucking engagement with the lathe or other machine in which the blank is to be finally machined and finished.

By this arrangement a very convenient and easily worked blank is produced, and one which may be very accurately and securely held for the boring, threading and finishing operations which result in the finished blank shown in Fig. 5.

We claim:

1. As a new article of manufacture, a blank for fuse bodies and the like, having a shank portion at one end, a truncated cone portion at the other end, and a noncontinuous chucking lug projecting laterally from said conical portion, which lug is adapted to be machined off after the finishing operations are completed.

2. As a new article of manufacture, a blank for fuse bodies and the like, having a shank portion at one end, a truncated cone portion at the other end, and a plurality of noncontinuous chucking lugs projecting laterally from said conical portion, which lugs are adapted to be machined off after the finishing operations are completed.

3. As a new article of manufacture, a blank for fuse bodies and the like, having a shank portion at one end, a truncated cone portion at the other end, and a plurality of substantially wedged shaped chucking lugs projecting laterally from said conical portion, which lugs are adapted to be machined off after the finishing operations are completed.

4. As a new article of manufacture, a blank for fuse bodies and the like, having a shank portion at one end, a truncated cone portion at the other end, and a plurality of substantially wedged shaped chucking lugs at the top of the truncated cone portion, which lugs are adapted to be machined off after the finishing operations are completed.

5. The method of forming fuse body blanks and similar articles, which consists in shaping the material to substantially finished form with a shank at one end and a cone shaped section at the other end, forming on said cone shaped section a series of chuck engaging lugs, machining and finishing the blank, and then machining off said lugs.

6. The method of forming fuse body blanks and similar articles which consists in shaping the material to substantially finished form, forming a series of chuck engaging lugs on the fuse body blank, machining and finishing the blank, and then machining off said lugs.

In testimony whereof we have hereunto set our hands.

CARL G. HEIBY.
JOHN BURKAM.
DAVID E. LINDQUIST.
FRED L. RIGGIN.
EBENEZER W. ALLEN.
RICHARD LAU.